(12) United States Patent
McCullen et al.

(10) Patent No.: US 11,156,708 B2
(45) Date of Patent: Oct. 26, 2021

(54) SYSTEMS AND METHODS FOR ENHANCED RECEPTION

(71) Applicant: Aviation Communication & Surveillance Systems, LLC, Phoenix, AZ (US)

(72) Inventors: Robert John McCullen, Phoenix, AZ (US); Benjamin Jeffrey Paulson, Phoenix, AZ (US); Mark Dean Smith, Phoenix, AZ (US); James R. Troxel, Phoenix, AZ (US); Gregory T. Stayton, Phoenix, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 319 days.

(21) Appl. No.: 15/998,820

(22) Filed: Aug. 15, 2018

(65) Prior Publication Data
US 2021/0255310 A1    Aug. 19, 2021

Related U.S. Application Data

(60) Provisional application No. 62/545,614, filed on Aug. 15, 2017.

(51) Int. Cl.
*G01S 13/28*    (2006.01)
*G01S 13/78*    (2006.01)
(Continued)

(52) U.S. Cl.
CPC ............ *G01S 13/28* (2013.01); *G01S 13/784* (2013.01); *G01S 7/003* (2013.01); *G01S 13/765* (2013.01); *G01S 13/767* (2013.01); *H04B 7/0854* (2013.01)

(58) Field of Classification Search
CPC ...... G01S 13/784; G01S 13/765; G01S 7/003; G01S 13/767; G01S 13/78; G01S 19/15;
(Continued)

(56) References Cited

U.S. PATENT DOCUMENTS 5,389,933 A * 2/1995 Golinsky ................. G01S 7/023
  342/201
2007/0291866 A1* 12/2007 Rajappan ............. H04B 7/0413
  375/267

(Continued)

FOREIGN PATENT DOCUMENTS

GB    2518364 A  *  3/2015  .............. G01S 7/40
WO    2006040730      4/2006

OTHER PUBLICATIONS

D.J. Milojevic, B.M. Popovic, Improved Algorithm for the pulse deinterleaving of radar pulse, IEE proceedings-F, vol. 139, No. 1, Feb. 1992. (Year: 1992).*

(Continued)

*Primary Examiner* — Olumide Ajibade Akonai
(74) *Attorney, Agent, or Firm* — Dickinson Wright PLLC

(57) ABSTRACT

Various communication systems may benefit from enhanced reception methods. For example, various transponders and surveillance systems may benefit from reception methods that can distinguish between overlapping pulses from multiple sources. A method can include receiving, at an antenna, a first series of pulses from a first source. The method can also include receiving, at the antenna, a second series of pulses from a second source. The first series and the second series can at least partially overlap each other. The method can further include de-interleaving the first series from the second series using at least one non-time-domain technique.

34 Claims, 11 Drawing Sheets

(51) Int. Cl.
*G01S 13/76* (2006.01)
*G01S 7/00* (2006.01)
*H04B 7/08* (2006.01)

(58) Field of Classification Search
CPC ........ G01S 7/021; G01S 7/2923; G01S 13/87;
G01S 7/285; G01S 13/282; G01S 13/284;
G01S 13/582; G01S 7/4021; H04L
25/4902; H04L 27/10; H04L 1/0071;
H04L 27/02; H04B 7/18506; H04B
17/0082; H04B 1/7163; H04B 7/0413;
H04B 7/0417; H04B 1/1027; H04B 1/40;
H04B 7/0854; G08G 5/0008; H03F 3/24
See application file for complete search history.

(56) References Cited

U.S. PATENT DOCUMENTS

| | | | | |
|---|---|---|---|---|
| 2008/0101417 | A1* | 5/2008 | Chapman | H04B 1/1027 370/497 |
| 2009/0322587 | A1* | 12/2009 | Stayton | H04L 27/18 342/37 |
| 2015/0116141 | A1* | 4/2015 | Hammack | G01S 7/021 342/13 |
| 2016/0209492 | A1* | 7/2016 | Grandin | H04B 1/7163 |
| 2016/0349361 | A1* | 12/2016 | Schulte | G01S 13/79 |
| 2017/0366223 | A1* | 12/2017 | Stofer | G01S 7/021 |

OTHER PUBLICATIONS

Gaspare Galati, Simone Bartolini, Luca Mene, Analysis of SSR Signals by Super Resolution Algorithms, Signal Processing and Information Technology, 2004, Proceedings of the forth IEEE International Symposium on Rome, Italy, Dec. 18-21, 2004, Piscataway, NJ, USA, IEEE, Dec. 18, 2004 (Dec. 18, 2004), pp. 166-170.

Gaspare Galati, Maurizio Gasbarra, Emilio G. Piracce, Decoding Techniques for SSR Mode S Signals in High Environment, 2005 European Microwave Conference CNIT La Defense, Paris France Oct. 4-6, 2005, Piscatawary, NY, USA, IEEE, vol. 3, Oct. 4, 2005 (Oct. 4, 2005) pp. 2107-2110.

Notification of Transmittal of the International Search Report and the Written Opinion of the International Searching Authority, or the Declaration dated Dec. 10, 2018 by the European Patent Office for related international patent application PCT/US2018/000193.

* cited by examiner

SYSTEMS AND METHODS FOR ENHANCED
RECEPTION

CROSS-REFERENCE TO RELATED APPLICATION

This application is related to and claims the benefit and priority of U.S. Provisional Patent Application No. 62/545,614, filed Aug. 15, 2017, the entirety of which is hereby incorporated herein by reference.

FIELD

Various communication systems may benefit from enhanced reception methods. For example, various transponders and surveillance systems may benefit from reception methods that can distinguish between overlapping pulses from multiple sources.

RELATED ART

The traffic alert and collision avoidance system (TCAS)/transponder secondary radar surveillance system is a form of active surveillance allowing a TCAS transceiver to interrogate and receive replies from an intruding aircraft's transponder. Based on these replies, for example based on a reply delay and type of reply, the bearing, slant range, altitude, and closure rate, among other things, of the intruder may be derived, allowing for collision and conflict resolution. Bearing may be derived via the use of a directional antenna. In receive mode, the primary purpose of the bearing information may be to assist the pilot in visually acquiring the intruder. Bearing may or may not be used to determine the closure rate, or to provide evasive horizontal maneuvers.

In transmit mode, another purpose of the directional antenna may be to limit the volume of airspace that may be included in the interrogation in order to reduce the likelihood of synchronous replies from multiple transponders, which may result in the replies interfering with one another. When this interference occurs, it is known as a garbled reply, and it may occur primarily with air traffic control radar beacon system (ATCRBS) only transponder equipped aircraft. To prevent garble, the TCAS interrogator may target intruders within specific sections of the airspace.

FIG. 1 illustrates how a volume of airspace may be broken into ring-like sectors. The use of the directional antenna may enable interrogations to be focused on one quadrant of the airspace at a time. The use of a whisper-shout technique may further break that quadrant of airspace into range rings by adjusting the power level of the transmitted interrogation and by transmitting a lower level pulse to suppress undesired transponder replies. Intruders beyond the darkened ring may not reply, because the power level of the interrogation is too low for them to receive. Intruders closer than the darkened ring may not reply, because the suppression pulse restricts them from replying. Thus the transponders that may reply are largely contained within the darkened ring and the probability of garble is reduced. In FIG. 1, intruder 1 and intruder 2 may be interrogated independently.

FIG. 2 illustrates how a volume of airspace may be broken into rings. FIG. 2 demonstrates a similar scenario to FIG. 1, except with the use of an omnidirectional antenna instead of a directional antenna. When using an omnidirectional antenna, the system can no longer interrogate in a single quadrant. However, the use of whisper shout may allow the system to retain the range rings for at least partial reduction in the quantities of intruders being interrogated. For two aircraft with the same relative range to the interrogator, the transponders' replies may be received almost simultaneously by the TCAS receiver. Depending on the degree of synchronicity between the overlapped replies, this can result in neither aircraft's reply being decoded.

Radio Technical Commission for Aeronautics (RTCA) document DO-185B (for TCAS II) and RTCA document DO-197A (for TCAS I) lay out requirements for determining the minimum performance of a TCAS receiver under garbled conditions. These RTCA documents require, under certain scenarios, a successful reply decoding rate of 50-60%. This is a dramatic decrease in performance when compared to the 99% requirement for interference free operation. This percentage level for replies received (namely above 90%, such as 99%) can be routinely achieved with a directional interrogation scheme. However, some platforms, such as many unmanned aircraft system (UAS) platforms, are not capable of hosting a directional antenna as large as the directional antenna designs currently available today. For example, one directional antenna available from Aviation Communication & Surveillance Systems, Inc. (ACSS) is approximately 9.3" in diameter, virtually equivalent to the diameter of the fuselage of a UAS. Further, the weight of such an antenna may represent a significant portion of the UAS payload.

One issue that may prevent the successful decode of garbled ATCRBS replies may be the summing of the received signals in the receiver. This may cause ambiguity between different replies, making them more difficult to correctly decode. FIG. 3 illustrates the signals of three overlapping replies in time domain. While this figure shows the different replies with different shading, making them easier to distinguish, the receiver sums the signals together, making it more difficult to determine which pulse belongs to which reply. This typically results in garbled replies. FIG. 4 expands the time domain image to make the effect shown in FIG. 3 more apparent.

FIGS. 3 and 4 illustrate why it is difficult to degarble replies in the time domain. Special techniques may be used to determine whether pulses are in acceptable positions to represent a valid reply, and with the help of directional interrogations, the degarble requirement may be met. For example, one technique currently utilized on some ACSS TCAS products implements a pulse detector that merges over-lapping replies that are within a 9 dB window into a digital pulse stream and a reply decoder and software processing to attempt to de-conflict the replies using digital logic and software algorithms. DO-185B, and particularly Section 2.4.2.1.4.4 "Detection of Garbled Replies" thereof, is one benchmark of the ability to process the degarbled replies.

However, given equivalent airspace, the use of an omnidirectional antenna with current RF receivers would not achieve the equivalent degarble performance as when using a directional antenna.

SUMMARY

According to certain embodiments of the present invention, a method can include receiving, at an antenna, a first series of pulses from a first source. The method can also include receiving, at the antenna, a second series of pulses from a second source. The first series and the second series can at least partially overlap each other. The method can further include de-interleaving the first series from the second series using at least one non-time-domain technique.

In certain embodiments of the present invention, a system can include an antenna configured to receive a first series of pulses from a first source and a second series of pulses from a second source. The first series and the second series can at least partially overlap each other. The system can include a processor configured to de-interleave the first series from the second series using at least one non-time-domain technique.

DETAILED DESCRIPTION

Various communication systems may benefit from enhanced reception methods. For example, various transponders and surveillance systems may benefit from reception methods that can distinguish between overlapping pulses from multiple sources.

For example, there may be a need for a TCAS system to be able to use a much smaller and lighter antenna, such as an omnidirectional antenna. For the use of an omnidirectional transmission to be feasible, the garbled reception performance may need to be improved to demonstrate a high level of safety and performance, compared to a sectorized interrogation scheme. This may enable the use of an omni-directional antenna, decreasing the complexity and Space, Weight, Power and Cost ("SWaP-C") of the TCAS receiver. It may also enable installation of the TCAS system on aircraft platforms that may not support the space requirements for a large TCAS antenna, for example the Class 3 and lower UAS markets.

Certain embodiments of the present invention may improve the probability of successful reception and decoding of garbled replies. In order for this to work in an omnidirectional transmit and receive environment, an increased number of replies may have to be successfully degarbled while exhibiting equivalent success rates, as required for a TCAS system. This could be used, for among other things, for both ATCRBS and Mode S reception, allowing for utilization in both TCAS I and TCAS II systems.

While in the time domain it may be extremely difficult to distinguish two overlapping replies, it may be possible to distinguish these overlapping replies in the frequency domain, if the frequencies are separated enough to filter properly. Certain embodiments of the present invention may improve ATCRBS or Mode S garbled replies. ATCRBS transponders generally represent the oldest and least expensive types of transponders fielded today. ATCRBS transponders are allowed to operate at any frequency between 1087 MHz and 1093 MHz, whereas Mode S transponders must operate between 1089 MHz and 1091 MHz. Thus, the fielded transponder population may have enough frequency variation such that a method of differentiating replies due to frequency would be feasible. Although this technique is more likely to be able to discriminate between ATCRBS transponder replies, it is applicable to Mode S replies as well or in the discrimination of ATCRBS replies from Modes S replies. Further frequency variations may be obtained by Doppler shift occurring by the intruder aircraft operating at differential speeds, as compared to own aircraft.

Figure 5:
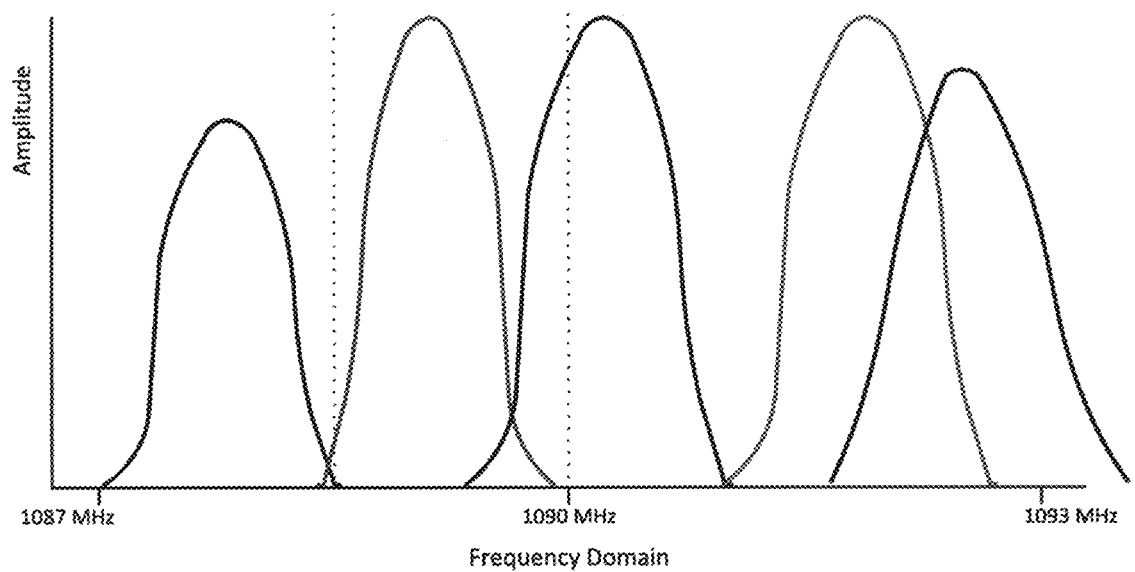
FIG. 5 illustrates a frequency domain plot of the highly unlikely condition of five simultaneous replies

FIG. 5 illustrates a frequency domain plot of the highly unlikely condition of five simultaneous replies. If a filter technique is employed, with a filter bandwidth outlined by the dotted line, several of the replies can be ignored while focusing on a single reply.

Figure 6:
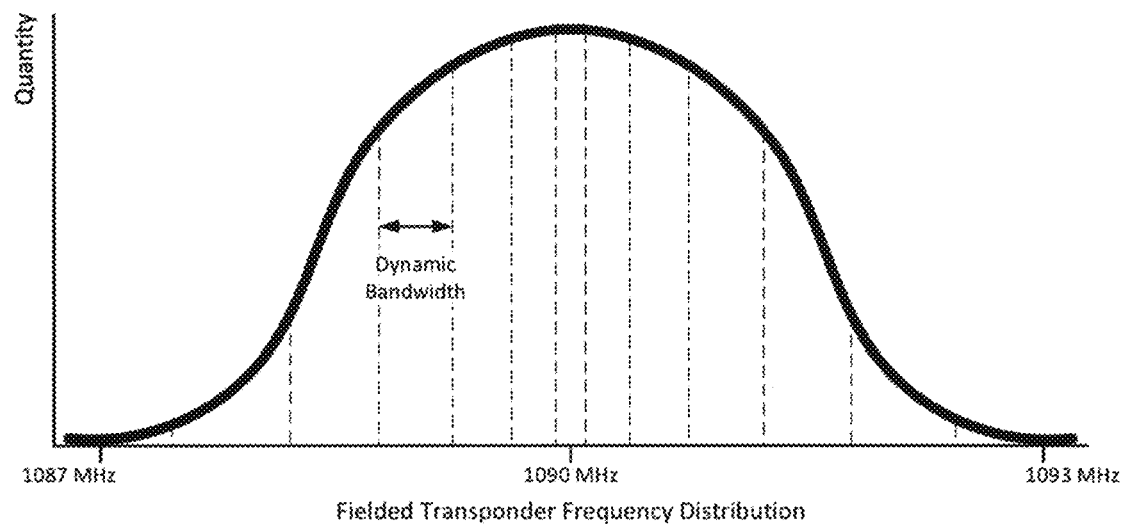
FIG. 6 illustrates a hypothetical distribution of fielded transponder transmitter frequencies.

FIG. 6 illustrates a hypothetical distribution of fielded transponder transmitter frequencies. As shown in FIG. 6, fewer transponders are likely to be operating at the band edges of 1087 MHz and 1093 MHz. In an example method for providing frequency domain differentiation, the selected bandwidth can be determined in multiple different ways. One approach could be to divide the spectrum up into a number of equal bandwidth segments. Alternatively, the bandwidth segments could be selected so as to distribute the transponder population evenly, resulting in non-uniform bandwidths. Another method may use a dynamic bandwidth that may be dependent on the transponder population that is currently being interrogated.

Figure 9:
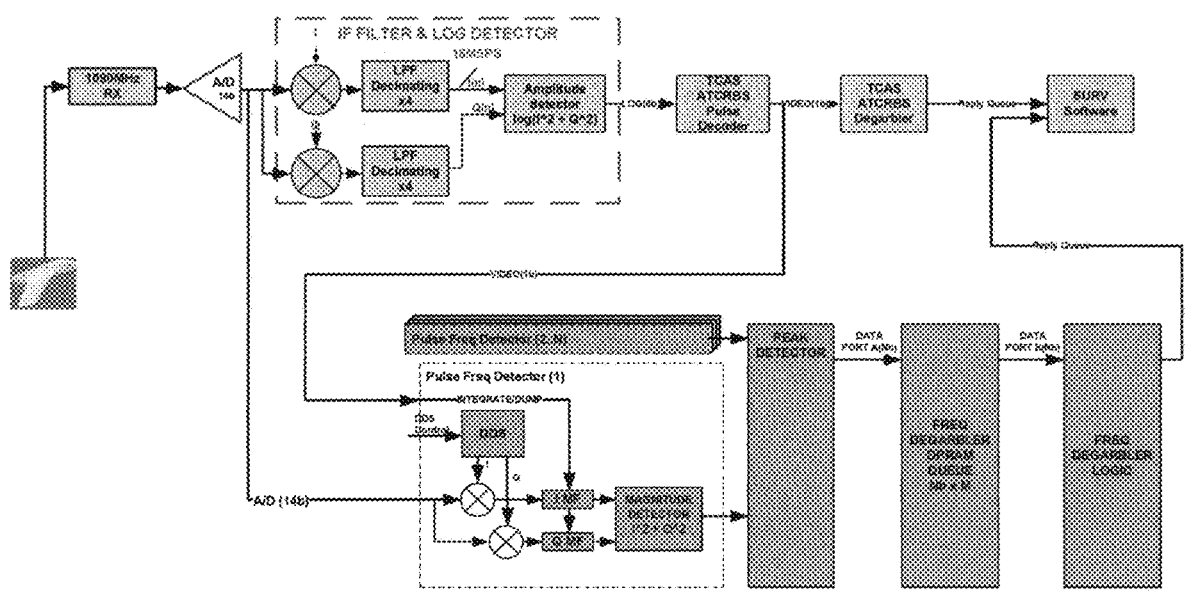
FIG. 9 shows a simplified block diagram of one possible implementation of a system consistent with certain embodiments of the present invention in a 1090 receiver system.

FIG. 9 shows a simplified block diagram of one possible implementation of a system consistent with certain embodiments of the present invention in a 1090 receiver system. The blocks that are shown in darker grey along the top row in FIG. 9 may be provided by ACSS's systems, such as the T³CAS and the NGT9000, which may perform ATCRBS reply processing.

Again referring to FIG. 9, the system may convert the A/D samples of the IF frequency to I and Q data at base-band, which may go through low-pass filters (LPF) and an amplitude detector. The RF bandwidth of the filters may be approximately 10 MHz in order to allow the processing of ATCRBS replies from 1087 to 1093 MHz. The TCAS ATCRBS pulse decoder may perform pulse decoding, which may validate the pulse width, rising edge rate, amplitude and may implement a DMTL function to eliminate multi-path. The output of the pulse decoder may be fed into a TCAS ATCRBS degarbler, which may attempt to de-interleave multiple replies by looking for bracket detects and possible pulse positions. A bracket detect can refer to looking for the first and last pulse of ATCRBS replies, which are known as framing pulses (F1 and F2). These pulses are always present on each reply, while data pulses are conditionally present based on the encoded message. The potential replies, along with low confidence bits, may be provided to the TCAS Surveillance software, which may perform additional filtering.

In order to perform frequency discrimination of each pulse, the output of the A/D converter can be run to a number (N) of parallel Pulse Frequency Detectors, which may provide a narrow frequency discrimination by dividing the frequency distribution based on a pre-determined frequency allocation. The frequency bandwidths of the parallel Pulse Frequency Detectors could be selected according to a linear distribution from 1087 to 1093 MHz, or a non-linear or Gaussian distribution based on the expected population of ATCRBS reply frequencies. Further the bandwidths could be dynamically determined based on the actual transponder frequencies being received, in order to more evenly distribute the different transponder reply frequencies amongst the parallel Pulse Frequency Detectors. The Pulse Frequency Decoders may mix the sampled IF signal with a digital data synthesis (DDS) set to the desired frequency to provide in-phase and quadrature outputs at base-band. The output of the mixer may go through an integrator, which may effectively be a matched filter, which may be turned on when a pulse has been detected by the TCAS ATCRBS Pulse Decoder. The output of each of the Pulse Frequency Detectors may be compared by the Peak Detector, and a word in the FREQ DEGARBLER DPRAM QUEUE (data width is N bits wide) may be stored with a "1" in the bit location which has the peak value.

Figure 7:
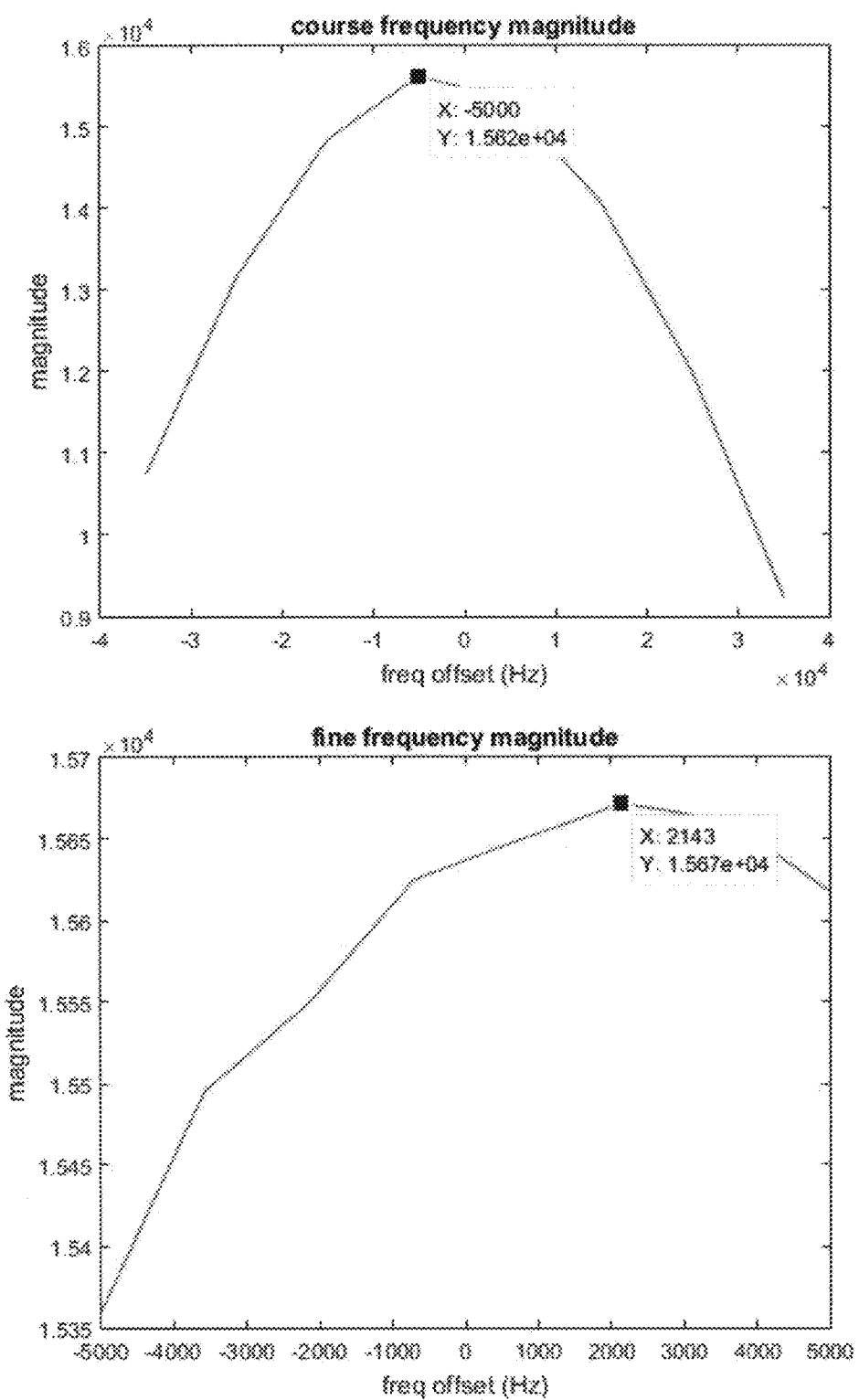
FIG. 7 below depicts a course and a fine frequency plot for a set of pulses, where the frequency is approximately −2.5 KHz off of the center.

In order to conserve FPGA resources, it is also possible to use a single set of Pulse Frequency Detectors using multiple passes of increasing frequency resolution to perform frequency discrimination of each pulse. FIG. 7 below depicts a course and a fine frequency plot for a set of pulses, where the frequency is approximately −2.5 KHz off of the center. The course plot is at the top, while the fine plot is at the bottom. The course plot may determine the frequency to the nearest 10 KHz resolution through processing 8 simultaneous detectors, the highest magnitude in this example being at −5 KHz. The fine plot may then re-process the pulses with a finer resolution (approximately 1.2 KHz). The resulting fine frequency may be in this example 2143 Hz. The total frequency offset may be −5 KHz+2.143 KHz=−2.85 KHz, which is to the nearest 0.6 KHz. Note a third set of processes could be used to get a finer resolution if desired.

Figure 8:
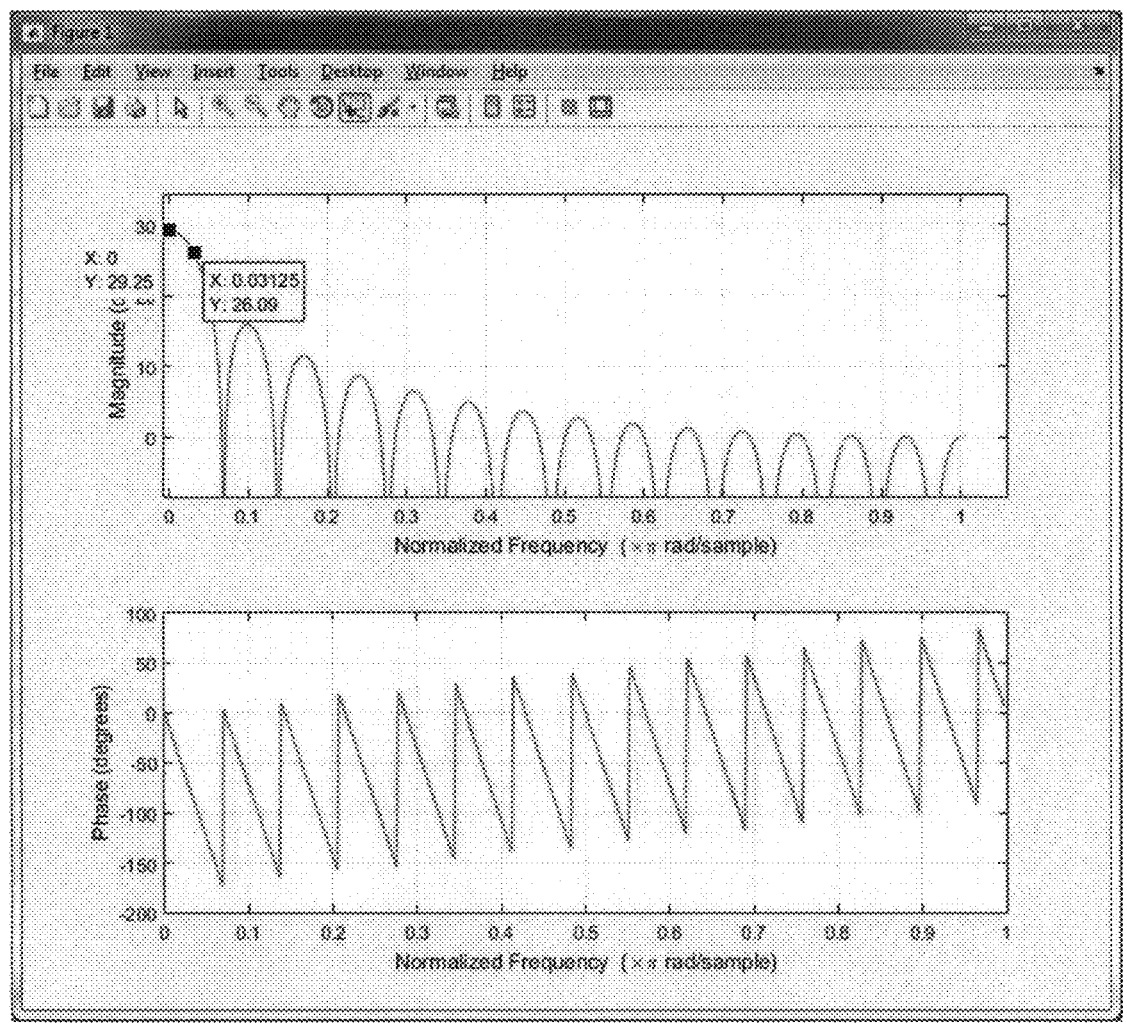
FIG. 8 shows a frequency response of matched filters according to certain embodiments.

The integrate/dump (e.g. matched filters) may have the frequency response shown in FIG. 8 below. Thus, FIG. 8 shows a frequency response of matched filters according to certain embodiments. The normalized frequency in the figure may be 32 MHz, so the LPF has a 3 dB cutoff of about 1 MHz (32*0.03125). The filter may be much narrower than the TCAS IF filter (e.g., 5 MHz cutoff).

The output of the FREQ DEGARBLER DPRAM QUEUE may be processed by the FREQ DEGARBLER LOGIC, which may perform similar functions as the TCAS ATCRBS Degarbler (e.g., framing and data pulse detection). However, the performance may be improved because the overlapping AICRBS replies may be separated into separate bins for processing.

Referring once more to FIG. 9, the results of the FREQ DEGARBLER may be provided as an additional input to the SURV Software in order to improve the decoding percentage. Note that there may be cases where a legacy TCAS ATCRBS degarbler could out-perform the FREQ DEGARBLER, so both paths could be retained. For example, if one of the ATCRBS replies is from a transponder with a resonant frequency source instead of a PLL, the reply may "pull off frequency" significantly from the first to last pulse, so the FREQ Degarbler may not perform as well in this situation.

Figure 10:
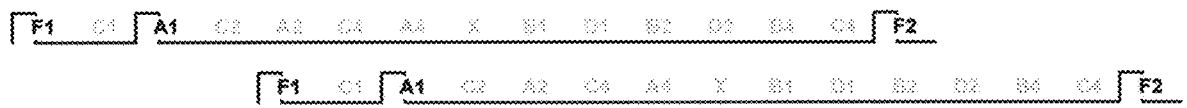
FIG. 10 is an example of two overlapping replies that would work better using the FREQ DEGARBLER approach, if they are separated in frequency.

FIG. 10 is an example of two overlapping replies that would work better using the FREQ DEGARBLER approach, if they are separated in frequency. In this case, the A2 and A4 pulse of the top reply are obscured by the F1 and A1 pulse of the bottom reply, so the conventional degarbler cannot infer if the top reply has a pulse in these positions or not.

At least the following additional or alternative potential improvements to the present invention degarbling algorithms, as described above, could be utilized with embodiments of the present invention: use of Doppler shift information between multiple transmissions to differentiate transmitters; use of combined Phase/Amplitude vectors to differentiate transmitters; use of the amplitude of received replies to differentiate transmitters, rather than merging replies into a single digital stream; use of a posteriori matched filter technique for consecutive reply correlation of an individual intruder; use of known Mode A squawk code of the tracked intruder in conjunction with the use of known or estimated Mode C altitude of a tracked intruder to provide two independent sets of reply pulses for each ATCRBS intruder received by requesting a Mode A only reply if a Mode C reply already has been received or vice versa; and use of deep memory to post process previously unsuccessful degarble attempts after a successful reception method has been identified for an intruder.

Figure 11:
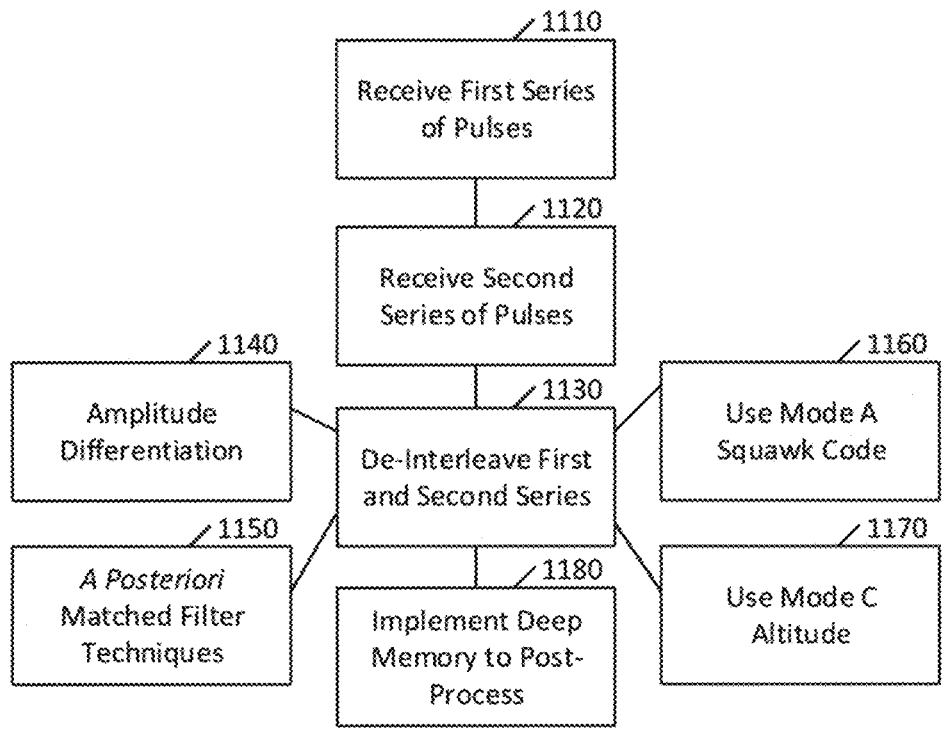
FIG. 11 illustrates a method according to certain embodiments of the present invention.

FIG. 11 illustrates a method according to certain embodiments of the present invention. The approach shown in FIG. 11 may embody the above examples and may, for example, be implemented with a system such as the system shown in FIG. 9.

Figure 1:
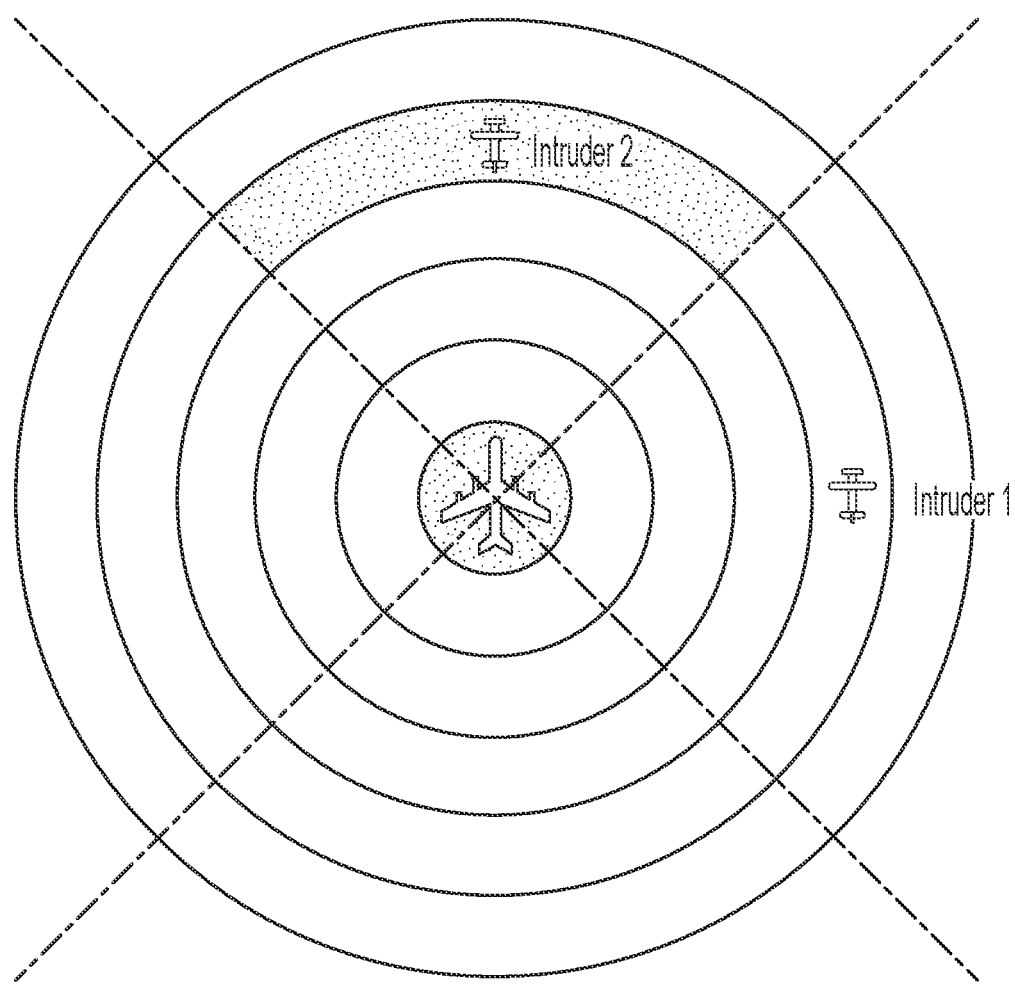
FIG. 1 illustrates how a volume of airspace may be broken into ring-like sectors.
Figure 2:
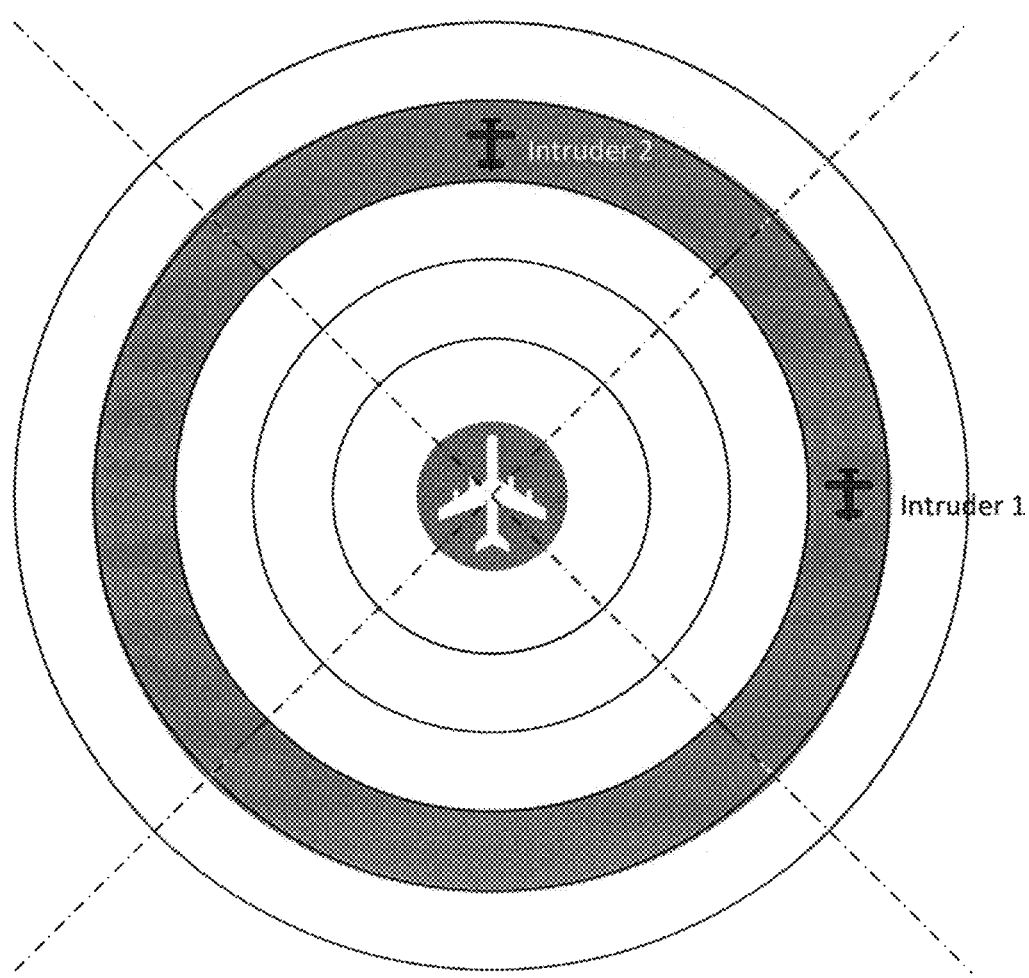
FIG. 2 illustrates how a volume of airspace may be broken into rings.
Figure 3:
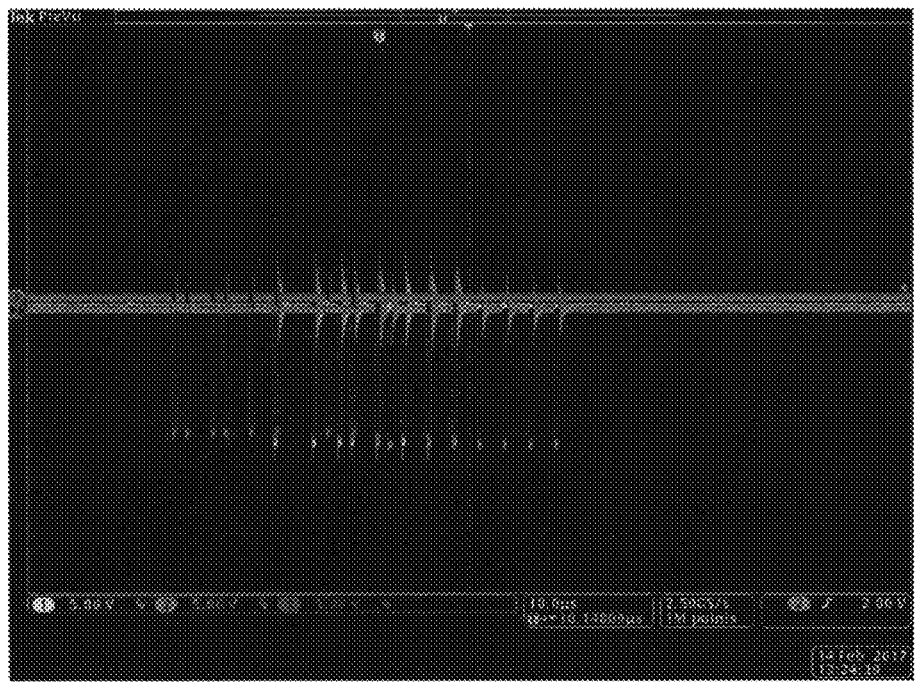
FIG. 3 illustrates the signals of three overlapping replies in time domain.
Figure 4:
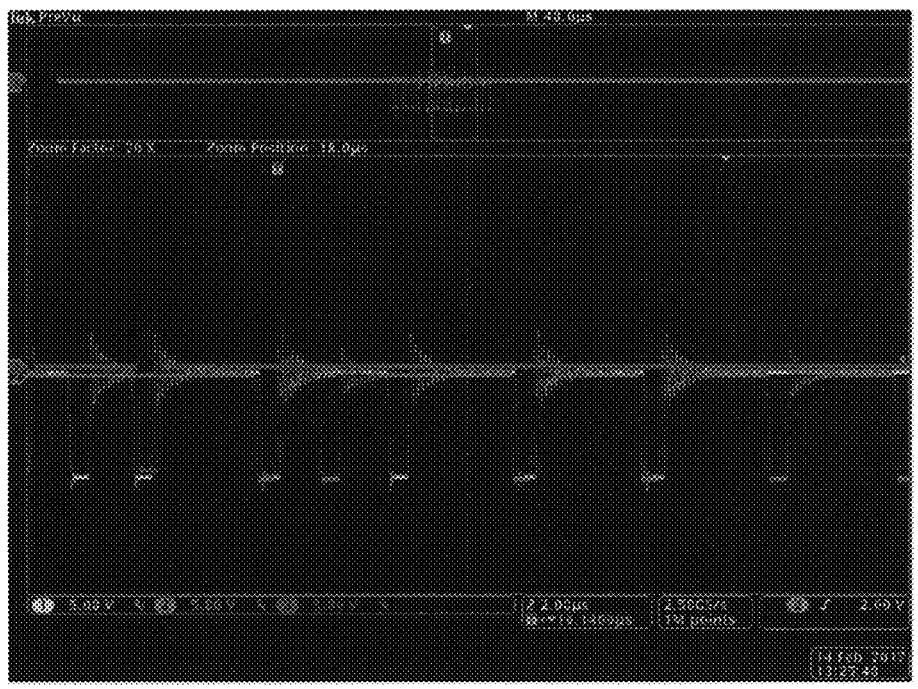
FIG. 4 expands the time domain image to make the effect shown in FIG. 3 more apparent.

The method of FIG. 11 may include, at 1110, receiving, at an antenna, a first series of pulses from a first source. The method may also include, at 1120, receiving, at the antenna, a second series of pulses from a second source. The first series and the second series may at least partially overlap each other. For example, the two series may overlap in time as shown in FIG. 10, or as shown in FIGS. 3 and 4.

The method of FIG. 11 may also include, at 1130, de-interleaving the first series from the second series using at least one non-time-domain technique.

The non-time-domain technique can be a frequency domain technique. For example, the frequency domain technique can include identifying a center frequency of each pulse and grouping pulses according to center frequency. As another option, the frequency domain technique can include identifying a phase of each pulse and grouping pulses according to phase. These options can be used alone or in combination with one another or in combination with any of the other techniques described herein.

The at least one non-time-domain technique can include performing frequency discrimination of each pulse. As one possible implementation, the output of an A/D converter receiving signals from the antenna can be run to a plurality of parallel pulse frequency detectors. The plurality of parallel pulse frequency detectors can provide a narrow frequency discrimination based on a pre-determined frequency allocation. Alternatively, the plurality of parallel pulse frequency detectors can provide a narrow frequency discrimination based on a variable frequency allocation. The variable or dynamic (not fixed) distribution can optimize the discrimination based on the actual transponder frequencies being received. This approach may involve an evaluation of previously received responses and may adjust filter values to discriminate actual transponders from each other. For example, the allowable 1087 MHz to 1093 MHz frequency range can be divided into bandwidths most likely to separate the replies being received at the moment. This may be a configurable filter, or predetermined filters that could be selected.

The predetermined frequency allocation can be a linear distribution from 1087 to 1093 MHz, or a non-linear or Gaussian distribution based on the expected or actual population of ATCRBS and Mode S reply frequencies.

The non-time-domain technique can be a phase domain technique. The phase domain technique can include identifying a phase of each pulse and grouping pulses according to phase. The phase domain technique may involve distinguishing pulses according to their phase-amplitude vectors.

The method can further include, at 1140, using the amplitude of received replies to differentiate transmitters. This may be done rather than merging replies into a single digital stream.

The method can further include, at 1150, using a posteriori matched filter techniques for consecutive reply correlation of an individual intruder The method can additionally include, at 1160, using a known Mode A squawk code of a tracked intruder to assist the de-interleaving. Likewise, the method can include, at 1170, using a known or estimated Mode C altitude of a tracked intruder to assist the de-interleaving. These may be used particularly in cases where at least one intruder has previously been identified in a previous interrogation. Likewise, these can be used in cases where a particular kind of reply code is expected in response to an interrogation. For example, a request can be made for an intruder to reply specifically with a Mode A squawk code or specifically with a Mode C encoded altitude. The replies from these two types of interrogations may assist in the de-interleaving of the replies. When the interrogation is first made, the intruder Mode A squawk code may not be known. Thus, certain embodiments may address the process after the Mode A squawk code is identified for an intruder.

For example, in certain embodiments the system can intentionally interrogate intruders in two different ways, in order to get two different pulse sequences for each intruder aircraft. This may provide additional context clues that may help identify a pattern that can distinguish between the two replies. Thus, in certain embodiments the method can include the intruder being interrogated in two ways to help distinguish between the replies. The method may include using alternate Mode A and Mode C interrogations of an intruder to ensure that two independent reply types are received, thus offering more opportunities to de-interleave replies.

The method can further include, at 1180, implementing deep memory to post-process previously unsuccessful de-interleave attempts after a successful reception method has been identified for an intruder. This approach may be used to go back and de-garble responses from a previous round of interrogations, once an intruder is successfully identified.

The antenna used in certain embodiments can be an omnidirectional antenna, a directional antenna, or an array that includes both omnidirectional and directional antennas.

The deinterleaving can be performed for a full alerting system, such as a TCAS II system. Alternatively, the deinterleaving can be performed for a traffic alert system, such as a TAS or TCAS I system. The traffic alert system is, in some cases, a non-advisory system. In short, certain embodiments can be used regardless of whether the system is a TAS, TCAS I, TCAS II, or other system. Both TCAS and non-TCAS systems can implement the method.

A system according to certain embodiments can include an antenna configured to receive a first series of pulses from a first source and a second series of pulses from a second source. The first and second sources may be two different intruder aircraft. The first series and the second series may at least partially overlap each other, as described above. The system can also include a processor configured to de-interleave the first series from the second series using at least one non-time-domain technique. The processor may be any suitable computer hardware, such as an application specific integrated circuit (ASIC), a central processing unit (CPU), or a field programmable gate array (FPGA). Other implementations are also permitted. The processor can include one or multiple processing cores, and these cores may each be configured to carry out computer instructions stored in memory. The memory may be any form of computer-readable medium, such as a non-transitory computer-readable medium. The memory may be on a same chip with the processor, or may be implemented separately. The memory can include random access memory (RAM) and/or read only memory (ROM) and may be implemented using flash RAM or platter-based computer hard drives. Other memory techniques and storage devices are also permitted.

The above examples are non-limiting examples that should be taken as illustrative of the principles and systems to which certain embodiments of the present invention can be applied. Various modifications to, improvements on, and additions to these examples are permitted. For example, as mentioned above both a traditional de-interleaving and the de-interleaving based on non-time-domain techniques can be performed in parallel or series to one another.

What we claim is:

1. A method, comprising:
   receiving, at an antenna, a from a first source;
   receiving, at the antenna, a second series of pulses first series of pulses from a second source, wherein the first series and the second series at least partially overlap each other; and
   de-interleaving the first series from the second series using at least one non-time-domain technique; and
   using a posteriori matched filter techniques for consecutive reply correlation of an individual intruder.

2. The method of claim 1, wherein the non-time-domain technique comprises a frequency domain technique.

3. The method of claim 2, wherein the frequency domain technique comprises identifying a center frequency of each pulse and grouping pulses according to center frequency.

4. The method of claim 1, wherein the at least one non-time-domain technique comprises performing frequency discrimination of each pulse.

5. The method of claim 1, wherein the output of an A/D converter receiving signals from the antenna is run to a plurality of parallel pulse frequency detectors.

6. The method of claim 5, wherein the plurality of parallel pulse frequency detectors provide a narrow frequency discrimination based on a variable frequency allocation.

7. The method of claim 5, wherein the plurality of parallel pulse frequency detectors provide a narrow frequency discrimination based on a pre-determined frequency allocation.

8. The method of claim 7, wherein the predetermined frequency allocation is a linear distribution from 1087 to 1093 MHz, or a non-linear or Gaussian distribution based on the expected population of ATCRBS and/or Mode S reply frequencies.

9. The method of claim 1, further comprising using an amplitude of received replies to differentiate transmitters.

10. The method of claim 1, further comprising using alternate Mode A and Mode C interrogations of an intruder to ensure that two independent reply types are received.

11. The method of claim 1, wherein the non-time-domain technique comprises a phase domain technique.

12. The method of claim 11, wherein the phase domain technique comprises identifying a phase of each pulse and grouping pulses according to phase.

13. The method of claim 1, further comprising using phase-amplitude vectors of a plurality of received replies to differentiate transmitters.

14. The method of claim 1, further comprising implementing deep memory to post-process previously unsuccessful de-interleave attempts after a successful reception method has been identified for an intruder.

15. The method of claim 1, wherein the antenna comprises an omnidirectional antenna.

16. The method of claim 1, wherein the antenna comprises a directional antenna.

17. The method of claim 1, wherein the antenna comprises a plurality of antennas comprising directional antennas, omnidirectional antennas, or a combination of antenna types.

18. A system, comprising:
an antenna configured to receive a first series of pulses from a first source and a second series of pulses from a second source, wherein the first series and the second series at least partially overlap each other; and
a processor configured to de-interleave the first series from the second series using at least one non-time-domain technique; and
wherein the processor is further configured to use a posteriori matched filter techniques for consecutive reply correlation of an individual intruder.

19. The apparatus of claim 18, wherein the non-time-domain technique comprises a frequency domain technique.

20. The apparatus of claim 19, wherein the frequency domain technique comprises identifying a center frequency of each pulse and grouping pulses according to center frequency.

21. The apparatus of claim 18, wherein the at least one non-time-domain technique comprises performing frequency discrimination of each pulse.

22. The apparatus of claim 18, wherein the output of an A/D converter receiving signals from the antenna is run to a plurality of parallel pulse frequency detectors.

23. The apparatus of claim 22, wherein the plurality of parallel pulse frequency detectors provide a narrow frequency discrimination based on a variable frequency allocation.

24. The apparatus of claim 22, wherein the plurality of parallel pulse frequency detectors provide a narrow frequency discrimination based on a pre-determined frequency allocation.

25. The apparatus of claim 24, wherein the predetermined frequency allocation is a linear distribution from 1087 to 1093 MHz, or a non-linear or Gaussian distribution based on the expected population of ATCRBS reply frequencies.

26. The apparatus of claim 18, wherein the processor is further configured to use an amplitude of received replies to differentiate transmitters.

27. The apparatus of claim 18, wherein the processor is further configured to use alternate Mode A and Mode C interrogations of an intruder to ensure that two independent reply types are received.

28. The apparatus of claim 18, wherein the non-time-domain technique comprises a phase domain technique.

29. The apparatus of claim 28, wherein the phase domain technique comprises identifying a phase of each pulse and grouping pulses according to phase.

30. The apparatus of claim 18, wherein the processor is further configured to use phase-amplitude vectors of a plurality of received replies to differentiate transmitters.

31. The apparatus of claim 18, further comprising deep memory, wherein the processor is configured to use the deep memory to post-process previously unsuccessful de-interleave attempts after a successful reception method has been identified for an intruder.

32. The apparatus of claim 18, wherein the antenna comprises an omnidirectional antenna.

33. The apparatus of claim 18, wherein the antenna comprises a directional antenna.

34. The apparatus of claim 18, wherein the antenna comprises a plurality of antennas comprising directional antennas, omnidirectional antennas, or a combination of antenna types.

* * * * *